(12) United States Patent
Noguchi et al.

(10) Patent No.: US 11,241,877 B2
(45) Date of Patent: Feb. 8, 2022

(54) TRANSFER BODY, IMAGE RECORDING METHOD AND IMAGE RECORDING APPARATUS

(71) Applicant: CANON KABUSHIKI KAISHA, Tokyo (JP)

(72) Inventors: Mitsutoshi Noguchi, Kawaguchi (JP); Yoshikazu Saito, Inagi (JP); Tetsuya Kosuge, Yokohama (JP); Midori Kushida, Tokyo (JP); Tsukasa Sano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/736,050

(22) Filed: Jan. 7, 2020

(65) Prior Publication Data

US 2020/0139699 A1 May 7, 2020

Related U.S. Application Data

(63) Continuation of application No. PCT/JP2018/026197, filed on Jul. 11, 2018.

(30) Foreign Application Priority Data

Jul. 14, 2017 (JP) .............................. JP2017-138557

(51) Int. Cl.
*B41J 2/01* (2006.01)
*B41J 11/00* (2006.01)
(Continued)

(52) U.S. Cl.
CPC ............ *B41J 2/0057* (2013.01); *B32B 27/08* (2013.01); *B41J 2/01* (2013.01); *B41J 11/002* (2013.01);
(Continued)

(58) Field of Classification Search
None
See application file for complete search history.

(56) References Cited

U.S. PATENT DOCUMENTS 6,205,922 B1 * 3/2001 Henry .................... B41N 10/04
101/376
8,871,337 B2 10/2014 Kushida et al.
(Continued)

FOREIGN PATENT DOCUMENTS

JP 7-32721 A 2/1995
JP 2012-45923 A 3/2012
(Continued)

OTHER PUBLICATIONS

International Search Report in International Application No. PCT/JP2018/026197 (dated Aug. 2018).
(Continued)

*Primary Examiner* — Alejandro Valencia
(74) *Attorney, Agent, or Firm* — Venable LLP

(57) ABSTRACT

A porous layer included in a transfer body for image recording by a heat transfer method has a multiple layer configuration, and porous layers are provided such that when a thickness (mm) of each porous layer from a porous layer $P(1)$ of the plurality of porous layers on a side closest to the surface layer to a porous layer $P(n)$ on a side closest to the substrate is set to $t(n)$ ($n \geq 2$), and a total thickness of the transfer body is set to $T$ (mm), Expression (1): $C \times T \leq t(1) + \ldots + t(n)$ (here, $C=0.4$, and $T \geq 1$) is satisfied.

13 Claims, 1 Drawing Sheet

(51) Int. Cl.
*B41J 2/005* (2006.01)
*B32B 27/08* (2006.01)

(52) U.S. Cl.
CPC ... *B32B 2305/026* (2013.01); *B41J 2002/012* (2013.01)

(56) References Cited

U.S. PATENT DOCUMENTS

| | | |
|---|---|---|
| 9,102,137 B2 | 8/2015 | Koitabashi et al. |
| 9,354,557 B2 | 5/2016 | Noguchi |
| 9,690,235 B2 | 6/2017 | Noguchi |
| 10,384,470 B2 | 8/2019 | Yamane et al. |
| 10,507,666 B2 | 12/2019 | Yamane et al. |
| 10,569,531 B2 | 2/2020 | Ohnishi et al. |
| 2013/0127965 A1* | 5/2013 | Kushida ............ B41J 2/0057 347/103 |
| 2015/0118503 A1 | 4/2015 | Landa et al. |
| 2015/0273818 A1 | 10/2015 | Mantell et al. |
| 2016/0238968 A1 | 8/2016 | Bridges et al. |
| 2018/0304616 A1 | 10/2018 | Honda et al. |
| 2018/0304617 A1 | 10/2018 | Ohnishi et al. |
| 2018/0311951 A1 | 11/2018 | Sakamoto et al. |
| 2018/0319188 A1 | 11/2018 | Toyama et al. |
| 2018/0319189 A1 | 11/2018 | Ohnishi et al. |
| 2018/0319190 A1 | 11/2018 | Hirokawa et al. |
| 2018/0326719 A1 | 11/2018 | Masuda et al. |
| 2018/0326755 A1 | 11/2018 | Ohnishi et al. |
| 2019/0016118 A1 | 1/2019 | Saito et al. |

FOREIGN PATENT DOCUMENTS

| | | |
|---|---|---|
| JP | 2013-129093 A | 7/2013 |
| JP | 2014-193599 A | 10/2014 |
| JP | 2014-240164 A | 12/2014 |
| WO | 2017/119049 A1 | 7/2017 |
| WO | 2019/013254 A1 | 1/2019 |

OTHER PUBLICATIONS

International Preliminary Report on Patentability in International Application No. PCT/JP2018/026197 (dated Jan. 2020).
JP 2014-193599, U.S. Pat. No. 9,102,137 B2.
WO 2017/119049, U.S. Pat. No. 10,384,470 B2 U.S. Pat. No. 10,507,666 B2 2018/0304616 A1 2018/0304617 A1 2018/0311951 A1 2018/0319188 A1 2018/0319189 A1 2018/0319190 A1 2018/0326719 A1 2018/0326755 A1.
JP 2012-45923, U.S. Pat. No. 8,871,337 B2.
Extended European Search Report in European Application No. 18832774.6 (dated Mar. 2021).

* cited by examiner

TRANSFER BODY, IMAGE RECORDING METHOD AND IMAGE RECORDING APPARATUS

CROSS-REFERENCE TO RELATED APPLICATIONS

This application is a Continuation of International Patent Application No. PCT/JP2018/026197, filed Jul. 11, 2018, which claims the benefit of Japanese Patent Application No. 2017-138557, filed Jul. 14, 2017, both of which are hereby incorporated by reference herein in their entirety.

BACKGROUND OF THE INVENTION

Field of the Invention

The present invention relates to a transfer body, an image recording method and an image recording apparatus.

Description of the Related Art

There is known an image forming method by a transfer method in which an intermediate image is formed by ink on the image forming surface of a transfer body and the intermediate image on the transfer body is transferred to a recording medium.

In Japanese Patent Application Laid-Open No. H07-32721, in order to improve transferability of an intermediate image, a method of forming an intermediate image on a transfer body with ink including a resin emulsion, heating the intermediate image to a temperature which is higher than or equal to the minimum film-forming temperature of the resin emulsion and transferring to a recording medium has been proposed. Japanese Patent Application Laid-Open No. H07-32721 discloses a transfer body in which a rubber material is laminated on a metal substrate as a transfer body.

In the transfer type image forming method, in view of running cost, the transfer body is repeatedly used for image formation. However, when a series of image forming processes is repeatedly performed, various damages may occur gradually on the transfer body. Particularly, heat or pressure applied in a heating step or a transfer step may damage the transfer body. The repeated temperature changes in the series of image forming processes may reduce the durability of the transfer body.

In the image recording method disclosed in Japanese Patent Application Laid-Open No. H07-32721, the transferability of the intermediate image is improved by heating the intermediate image in the minimum film-forming temperature of the resin fine particles in the ink applied on the transfer body or higher. In view of the strength of the transferred image, there is a tendency in that the higher the minimum film-forming temperature of the intermediate image, the more preferable. However, when the transfer temperature is high, the temperature change in the image forming device increases, the pressing force of the intermediate image on the recording medium becomes unstable due to the thermal expansion of device parts, the image quality may deteriorate or the durability of the transfer body may decrease.

An object of the present invention is to provide a transfer body capable of achieving both image quality and durability even in repeated use in heat transfer type image recording and an image recording method and an image recording apparatus using the same.

SUMMARY OF THE INVENTION

The transfer body according to the present invention is a transfer body for image formation by a heat transfer method, the transfer body comprising: a substrate; a plurality of porous layers provided on the substrate; a surface layer having an image forming surface, when a thickness (mm) of each porous layer from a porous layer P(1) of the plurality of porous layers on a side closest to the surface layer to a porous layer P(n) on a side closest to the substrate is set to t(n) (n≥2), and a total thickness of the transfer body is set to T (mm), Expression (1) is satisfied:

$$C \times T \le t(1) + \ldots + t(n) \tag{1}$$

(here, C=0.4, T≥1, and n is an integer of 10 or less)

The image recording method according to the present invention is an image recording method, including: an image forming step of applying ink to the image forming surface of the transfer body to form an intermediate image; a transfer step of transferring the intermediate image to a recording medium; and a heating step of heating the intermediate image on the transfer body, in which the transfer body is the above-mentioned transfer body.

The image recording apparatus according to the present invention is an image recording apparatus, including: a transfer body; an image forming unit that applies ink to an image forming surface of the transfer body to form an intermediate image; a transfer unit that transfers the intermediate image from the transfer body to a recording medium; and a heating device that heats the intermediate image on the transfer body;

in which the transfer body is the transfer body.

Further features of the present invention will become apparent from the following description of exemplary embodiments with reference to the attached drawings.

DESCRIPTION OF THE EMBODIMENTS

Figure 1:
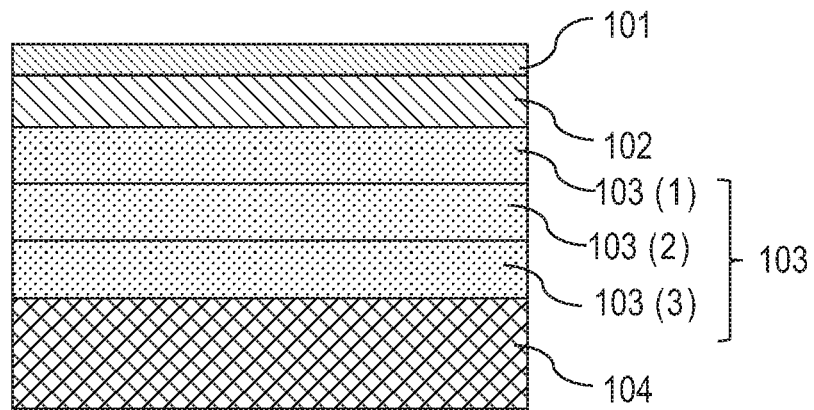
FIG. 1 is a schematic partial cross-sectional view illustrating a layer structure of an embodiment of a transfer body according to the present invention.

The transfer body according to the present invention includes a substrate, a plurality of porous layers mounted on the substrate and a surface layer having an image forming surface.

In the plurality of porous layers, when a thickness (mm) of each porous layer from a porous layer P(1) on a side closest to the surface layer to the porous layer P(n) on a side closest to the substrate is set to t(n) (n≥2), and a total thickness of the transfer body is set to T (mm), Expression (1) is satisfied.

$$C \times T \le t(1) + \ldots + t(n) \qquad \text{Expression (1)}$$

(here, C=0.4, T≥1. n is an integer of 10 or less.)

The porous layer P(1) on the side closest to the outermost surface layer means the porous layer on the side closest to the surface layer among the plurality of porous layers, and the porous layer P(n) on the side closest to the outermost substrate means the porous layer closest to the substrate among the plurality of porous layers. In Expression (1), t(1)+ . . . +t(n) means the sum (also referred to as the total thickness of the porous layers) of the thicknesses of the porous layers P(1) to P(n).

In Expression (1), T represents the thickness of the entire transfer body, and C represents a ratio of the thickness of the entire porous layers to the thickness T of the entire transfer body. C is preferably 0.5. When the thickness of the entire porous layer is large, the pressure generated at a certain distortion amount decreases, and the transferability decreases. Therefore, it is preferable that t(1)+ . . . +t(n) is 0.8×T or less. In view of easy attachment of the transfer body to the image recording apparatus, it is preferable that the thickness T (mm) of the entire transfer body is 1 mm or more to 4 mm or less.

In an image recording apparatus using the heat transfer method, as a support member that supports a transfer body or a transfer pressing member such as a transfer roller of a transfer unit, a member made of a material such as a metal that causes thermal expansion and contraction due to a temperature change is used in many cases. When the series of image forming processes is repeatedly performed, thermal expansion and contraction of these members are repeated due to temperature rise and fall. Generally, in a transfer body that exhibits the pressure generated in a transfer step due to the distortion amount of the porous layers, due to the change in thermal expansion and contraction, the pressure may not be constant. For example, in a state in which the pressing member and the support member of the transfer body are expanded, if the transfer body is pressed in the nip portion, a region in which the distortion amount is larger than an expected amount in the porous layers included in the transfer body, and a large pressure is applied is generated. In that case, image quality may be deteriorated after transfer by pressure unevenness. When a high pressure that exceeds the setting is applied, the durability of the transfer body decreases. Meanwhile, if, until the support member of the transfer body heated to the transfer temperature by heating reaches the transfer unit, the temperature is lowered to a temperature lower than the set transfer temperature, and the support member contracts, the distortion amount in the porous layer of the transfer body may be smaller than the expected amount. As a result, there may be a case where image quality is deteriorated after transfer due to pressure unevenness and transferability is deteriorated due to low pressure application.

In the present invention, it is possible to provide a transfer body that can deal with the above problems caused by the temperature environment in the device, by providing a plurality of porous layers satisfying Expression (1). That is, a major feature of the transfer body according to the present invention is to achieve all of the transferability, the image quality and the durability even in the above situation.

In obtaining the desired effect by the transfer body according to the present invention, the thickness of each porous layer satisfies Expression (2), and when the compression modulus of elasticity (MPa) of each porous layer from the porous layer P(1) on the side closest to the surface layer to the porous layer P(n) on the side closest to the substrate is set to E(n), it is preferable to satisfy Expression (3).

$$0.8 \leq t(1)+ \ldots +t(n) \leq 1.5 \quad \text{Expression (2)}$$

$$E(1) < E(2 \text{ to } n) \quad \text{Expression (3)}$$

Expression (3) indicates that the compression modulus of elasticity of each of the porous layers P(2) to P(n) is greater than the compression modulus of elasticity of the porous layer P(1).

Further, it is preferable that the thickness (mm) of each porous layer is 0.3≤t(1 to n)≤1.2.

0.3≤t(1 to n)≤1.2 indicates that the thicknesses of the porous layers P(1) to P(n) are all 0.3 mm or more to 1.2 mm or less.

That is, with respect to the thickness of the entire porous layer, the distortion amount tends to fluctuate due to the influence of the above thermal deformation, and the thickness is preferably thicker than that of a general transfer body. Meanwhile, this is because, when the thickness is excessively large, under a certain distortion amount, the pressure generated is reduced, and thus the transferability may be lowered. Therefore, the thickness of each porous layer is preferably 0.3 mm or more in order to deal with a large distortion amount and 1.2 mm or less in order to suppress a decrease in strength due to large deformation.

Further, the compression modulus of elasticity (MPa) of each porous layer is preferably 0.1≤E1<E(2 to n)≤30.

That is, the porous layer included in the transfer body preferably minimizes the compression modulus of elasticity of the porous layer on the side closest to the surface layer. The porous layer on the side closest to the surface layer affects the followability of the transfer body to the surface of the recording medium to improve the transfer efficiency. Meanwhile, the mechanical strength of the transfer body can be expressed by increasing the compression modulus of elasticity of the porous layer on the substrate side.

With respect to the transfer body, when the stress when the compression amount is "a" (mm) is X (MPa), and the stress when the compression amount is a+0.2 (mm) is set to Y (MPa), and the stress when the compression amount is a+0.3 (mm) is set to Z (MPa), it is preferable that the X satisfies Expression (4), and the Y satisfies the Expression (5) or that the X satisfies Expression (4), and the Z satisfies Expression (6).

$$0.1 \leq X \leq 0.5 \quad \text{Expression (4)}$$

$$0.5 \leq Y \leq 1.5 \quad \text{Expression (5)}$$

$$0.5 \leq Z \leq 2.0 \quad \text{Expression (6)}$$

(here, 0.1≤a≤0.2.)

That is, when the transfer body is mounted in the main body of the image forming device, more preferable compression stress characteristics can be exhibited when the compression amount is in the range of a to a+0.3 mm (here 0.1≤a≤0.2). Specifically, it is preferable that the transfer body has a minimum pressure (MPa) satisfying 0.1≤X≤0.5 within the above compression amount range in order to exhibit the transfer efficiency of the intermediate image and generates a maximum pressure (MPa) that satisfies 0.5≤Y or Z≤1.5 in order to suppress unevenness in stress and exhibits durability.

In the present invention, an image forming apparatus and an image forming method that apply ink by an ink jet method can be referred to as an ink jet recording apparatus and an ink jet recording method, respectively. In addition, the ink jet recording device including a transfer body is hereinafter referred to as a transfer type ink jet recording device for convenience, and the ink jet recording method using the transfer body is hereinafter referred to as a transfer type ink jet recording method for convenience. A transfer body for image formation by the heat transfer method is hereinafter simply referred to as a transfer body.

Hereinafter, the present invention will be described with reference to embodiments.

<Transfer Body>

FIG. 1 is a schematic partial cross-sectional view illustrating a layer structure of an embodiment of the transfer body according to the present invention. The transfer body shown in FIG. 1 has a surface layer 101, an elastic layer 102, porous layers 103 and a substrate (base layer) 104. The porous layer 103 has a multiple layer configuration including three porous layers 103(1) to 103(3) (n=3). Each of the porous layers 103(1) to 103(3) satisfies at least Expression (1).

The size of the transfer body can be freely selected according to the desired print image size. Examples of the overall shape of the transfer body include a sheet shape, a roller shape, a drum shape, a belt shape and an endless web shape.

Each layer will be described in detail below. The multiple layer structure in the transfer body may have a structure in which each layer is separately prepared and bonded with an intermediate layer such as an adhesive layer or may have a laminated structure in which the next layer is formed on the previously prepared or formed layer and integrated. Alternatively, the transfer body may have both of these two layer structures.

(Surface Layer)

At least a part of the open surface of the surface layer is used as an image forming surface. Various materials such as a resin and ceramic are appropriately used as the material for constituting the surface layer. These may be used singly or two or more kinds thereof may be used in combination.

Specific examples of the resin include an acrylic resin, an acrylic silicone resin and a fluorine-containing resin. Specific examples of ceramics include condensates of the organosilicon compound.

Especially, in view of image quality and transferability, the surface layer preferably contains the condensate of an organosilicon compound. The condensate of an organosilicon compound can be obtained by hydrolyzing and condensing a hydrolyzable organosilicon compound. In addition to this hydrolyzable organosilicon compound, a condensate of an organosilicon compound obtained by using a polymerizable organosilicon compound that can form a polymerization structure by cationic polymerization or radical polymerization is more preferable in view of durability.

Since the surface layer has a molecular structure including a siloxane bond derived from an organosilicon compound, a component provided by the ink constituting the intermediate image is effectively spread on the image forming surface of the surface layer, peeling of the intermediate image from the transfer body becomes easy, and the transferability is improved.

Specific examples of the hydrolyzable organosilicon compound include the following, but the present invention is not limited thereto. Examples thereof include glycidoxypropyltrimethoxysilane, glycidoxypropyltriethoxysilane, glycidoxypropylmethyldimethoxysilane, glycidoxypropylmethyldiethoxysilane, glycidoxypropyldimethylmethoxysilane, glycidoxypropyldimethylethoxysilane, 2-(epoxycyclohexyl) ethyltrimethoxysilane, 2-(epoxycyclohexyl) ethyltriethoxysilane, a compound obtained by substituting an epoxy group of these compounds with an oxetanyl group, acryloxypropyltrimethoxysilane, acryloxypropyltriethoxysilane, acryloxypropylmethyldimethoxysilane, acryloxypropylmethyldiethoxysilane, acryloxypropyldimethylmethoxysilane, acryloxypropyldimethylethoxysilane, methacryloxypropyltrimethoxysilane, methacryloxypropyltriethoxysilane, methacryloxypropylmethyldimethoxysilane, methacryloxypropylmethyldiethoxysilane, methacryloxypropyldimethylmethoxysilane, methacryloxypropyldimethylethoxysilane, methyltrimethoxysilane, methyltriethoxysilane, dimethyldimethoxysilane, dim ethyl diethoxysilane, trimethylmethoxysilane, tri methylethoxysilane, propyltrimethoxysilane, propyltriethoxysilane, hexyltrimethoxysilane, hexyltriethoxysilane, decyltrimethoxysilane and decyltriethoxysilane. These may be used singly or two or more kinds thereof may be used in combination.

The surface layer preferably contains 10% by mass or more to 100% by mass or less of these resins and ceramics in total. Moreover, it is more preferable to contain 30% by mass or more and even more preferable to contain 50% by mass or more. The surface layer can contain various fillers and additives within the above range.

A compression modulus of elasticity E1 of the surface layer is 10 MPa or more to 500 MPa or less. If the compression modulus of elasticity E1 is 10 MPa or more, the wear resistance of the transfer body can be improved. If the compression modulus of elasticity E1 is 500 MPa or less, cracks due to deformation of the entire transfer body can be suppressed.

In view of suppressing the mechanical strength and the internal stress in a case of deformation to more effectively exhibit the function as the surface layer, the thickness of the surface layer is preferably 0.01 μm or more to 10 μm or less. The upper limit of the thickness of the surface layer is more preferably 5 μm.

(Elastic Layer)

The elastic layer can improve the followability of the surface layer to the recording medium. As a material constituting the elastic layer, various materials such as a resin and ceramic can be appropriately used. In view of processing characteristics and the like, various elastomer materials and rubber materials are preferable. Specific examples include silicone rubber, fluororubber, chloroprene rubber, urethane rubber, nitrile rubber, ethylene propylene rubber, natural rubber, styrene rubber, isoprene rubber, butadiene rubber, ethylene-propylene-diene rubber and nitrile butadiene rubber. These may be used singly or two or more kinds thereof may be used in combination.

Particularly, silicone rubber, fluororubber and ethylene-propylene-diene rubber have a small change in a modulus of elasticity with temperature and are preferable in view of transferability. The elastic layer preferably contains 10% by mass or more to 100% by mass or less of at least one of these resins, ceramics and rubbers. Moreover, it is more preferable to contain 30% by mass or more and even more preferable to contain 50% by mass or more.

The thickness of the elastic layer is preferably 50 μm or more to 500 μm or less in view of followability to the recording medium. The upper limit of the thickness is more preferably 200 μm.

(Porous Layer)

Each porous layer generates a transfer pressure by compression. Examples of the material constituting each porous layer include acrylonitrile/butadiene rubber, acrylic rubber, chloroprene rubber, urethane rubber, silicone rubber, fluororubber and ethylene-propylene-diene rubber. Moreover, it is preferable to use a porous rubber material. These may be used singly or two or more kinds thereof may be used in combination. For forming the porous rubber material, for example, a method of forming a porous material formulating a predetermined amount of a vulcanizing agent, a vulcanization accelerator and the like at the time of molding the rubber material and formulating a filler such as an antifoaming agent, hollow particles or salt, if necessary, can be used.

With the porous layer, deformation on the surface of the transfer body is absorbed, and local pressure fluctuations are dispersed, to maintain satisfactory transferability even in the high-speed image recording. Particularly, when a porous rubber material is used to form the porous layer, with respect to various pressure fluctuations, the bubble parts are compressed with a volume change. Therefore, deformation in the direction other than the compression direction is small and more stable transferability and durability can be obtained. Examples of the porous rubber material include a continuous pore structure in which pores are continuous with each other and an independent pore structure in which pores are independent from each other. The porous structure of the porous layer may be any of these structures, and these structures may be used together. It is preferable that porous layers each independently contain 10% by mass or more to 100% by mass or less of a rubber material. The rubber material is more preferably contained in an amount of 30% by mass or more and even more preferably 50% by mass or more. Particularly, in the heat transfer method, the temperature controllability of the surface layer and the elastic layer can be further improved by controlling the thermal conductivity to be low with the presence of cavities. In view of simplifying the manufacturing step of the porous body, the number n of the porous layers is preferably 2 or more to 5 or less.

(Substrate)

The substrate (base layer) is used in order to provide transportability and mechanical strength. As a material constituting the substrate, metal, ceramic, a resin, woven fabric made of natural fibers or the like is preferably used. These may be used singly or two or more kinds thereof may be used in combination. In view of transportability and mechanical strength, the thickness of the substrate is preferably 0.1 mm or more to 1 mm or less.

(Support Member)

The transfer body of the present invention can be mounted on a support member. As a mounting method, various adhesives and double-sided tapes may be used. Otherwise, a mounting member made of a material such as metal, ceramic, a resin or the like to the transfer body may be mounted to fix and hold the transfer body on the support member by using the mounting member.

The shape and structure of the support member may be set to support the transfer body. For example, in the ink jet recording device illustrated in FIG. 2 as described below, a drum-shaped transfer body is formed by providing a transfer body on the outer circumferential surface of a drum-shaped support member.

<Image Recording Method>

The image forming method by using the transfer body according to the present invention includes the following steps.

(I) An image forming step of forming an intermediate image by applying ink to the image forming surface of the transfer body.

(II) A transfer step of transferring the intermediate image to a recording medium.

(III) A heating step of heating the intermediate image on the transfer body.

Further, the image forming step may include a reaction solution applying step of applying a reaction solution to the image forming surface.

The application of the reaction solution in the image forming step using the reaction solution and the ink can be performed at least one of before the ink application and after the ink application. The ink and the reaction solution are applied to the transfer body so that at least portions thereof are overlapped with each other. In order to more effectively increase the viscosity of the ink using the reaction solution, it is preferable to apply the ink to the image forming surface of the transfer body to which the reaction solution has been applied.

Moreover, it is preferable that each step is performed in the following temperature ranges.

(I) The image forming step is preferably performed at a temperature of 70° C. or lower. If the temperature is higher than this temperature, the jettability of the ink may be lowered to lower the image quality.

(II) The transfer step is preferably performed at a temperature of 70° C. or higher. If the temperature is lower than this temperature, the adhesive force between the intermediate image and the recording medium may be lowered to lower the transferability.

(III) The heating step is preferably performed at a temperature of 140° C. or lower. If the temperature is higher than this temperature, the deterioration of the transfer body may be accelerated to lower the durability.

(Reaction Solution)

The reaction solution contains a component (hereinafter sometimes referred to as "ink viscosity increasing component") for increasing the viscosity of the ink used in the image recording method of the present invention. Here, increasing the viscosity of the ink means a case where an increase in the viscosity of the entire ink is observed by the chemical reaction of a coloring material or a resin constituting the ink due to the contact with the ink viscosity increasing component or physical adsorption thereof to the ink viscosity increasing component. Further, the present invention is not limited to this case and includes a case where the viscosity is locally increased by agglomeration of a part of the ink composition such as a coloring material. Here, the "reaction" in the "reaction solution" includes not only a case where chemical reaction with the ink occurs but also a case where a physical action (such as adsorption) occurs. The ink viscosity increasing component has an effect of controlling bleeding and beading in a case of image formation by reducing the fluidity of a part of the ink on the transfer body.

As the ink viscosity increasing component, known materials such as a polyvalent metal ion, organic acid, a cationic polymer and porous fine particles can be used without particular limitation. Among these, polyvalent metal ions and organic acids are particularly preferable. It is also preferable to cause a plurality of types of ink viscosity increasing components to be contained. The content of the ink viscosity increasing component in the reaction solution is preferably 5% by mass or more with respect to a total mass of the reaction solution.

Specific examples of the metal ion that can be used as the ink viscosity increasing component include a divalent metal ion such as $Ca^{2+}$, $Cu^{2+}$, $Ni^{2+}$, $Mg^{2+}$, $Sr^{2+}$, $Ba^{2+}$ and $Zn^{3+}$, or a trivalent metal ion such as $Fe^{3+}$, $Cr^{3+}$, $Y^{3+}$ and $Al^{3+}$. Specific examples of the organic acid that can be used as the ink viscosity increasing component include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidonecarboxylic acid, pyronecarboxylic acid, pyrrolecarboxylic acid, furancarboxylic acid, viridine carboxylic acid, coumaric acid, thiophenecarboxylic acid, nicotinic acid, oxysuccinic acid and dioxysuccinic acid.

The reaction solution may contain an appropriate amount of water or an organic solvent. The water used in this case is preferably water deionized by ion exchange or the like. In addition, an organic solvent that can be used in the reaction solution is not particularly limited, and any known organic solvents can be used.

Various resins can also be added to the reaction solution. For example, it is preferable to add an appropriate resin to the reaction solution, because the adhesiveness of the intermediate image to the recording medium in a case of transfer can be caused to be satisfactory, or the mechanical strength of the final image can be increased. The material used for this resin is not particularly limited as long as the material can coexist with the ink viscosity increasing component.

Further, a surfactant or a viscosity adjusting agent may be added to the reaction solution to appropriately adjust the surface tension or the viscosity. The material used in this case is not particularly limited as long as the material can coexist with the ink viscosity increasing component. Specific examples of the surfactant used include ACETYLE-NOL E100 (trade name, manufactured by Kawaken Fine Chemicals Co., Ltd.). The surface energy of the reaction solution is preferably adjusted to 50 mN/m or less and more preferably adjusted to 20 mN/m to 40 mN/m.

Moreover, it is preferable that a reaction solution contains a fluorosurfactant. Here, the fluorosurfactant is a compound having at least a hydrophobic fluorocarbon chain and a hydrophilic molecular chain (hydrophilic part) in the molecular structure. If a hydrophobic fluorocarbon chain is provided, excellent surface tension reducing ability as described above is exhibited.

Among these, a nonionic surfactant having a fluoroalkyl chain as the hydrophobic part and an ethylene oxide chain as the hydrophilic part is preferably used. If a fluoroalkyl chain as the hydrophobic part and an ethylene oxide chain as the hydrophilic part are provided, compatibility with the solvent and the reactant is high, and thus excellent solubility even in a composition in which the amount of water is reduced due to drying or the like is exhibited. Therefore, the uniformity of the reaction solution layer and the surface tension reducing ability can be maintained.

If a nonionic surfactant is used, characteristics thereof can be maintained without structural change even after reaction with the ink composition, and thus the uniformity of the reaction solution layer and the surface tension reducing ability can be maintained.

Examples of the surfactant suitably used in this case include FSO100, FSN100 and FS3100 (all are trade names, manufactured by DuPont de Nemours, Inc.) and F444, F477 and F553 (all are trade names, manufactured by DIC Corporation).

The fluorosurfactant is preferably 1% by mass or more to 10% by mass or less with respect to the total mass of the reaction solution. When the content of the fluorosurfactant is small, the surface tension reducing ability is reduced, so it is preferable to increase the average ratio R of the surface area per unit area of the surface of the transfer body. For example, when the fluorosurfactant is 5% by weight, the average ratio R is preferably 1.5 or more. When the fluorosurfactant is 1% by weight, the average ratio R is preferably 1.7 or more.

(Application of Reaction Solution)

For applying the reaction solution to the image forming surface of the transfer body, various application methods known in the related art can be appropriately used. Specific examples include die coating, blade coating, a method using a gravure roller, a method using an offset roller and spray coating. The application method using an ink jet device is also preferable. Also, it is very preferable to combine several methods.

(Forming of Intermediate Image)

An intermediate image is formed by applying ink to the surface of the transfer body to which the reaction solution has been applied. In the present specification, an image (ink image) after being formed by applying the reaction solution and ink on the surface of the transfer body until being finally transferred to the recording medium is referred to as an "intermediate image" for convenience.

For example, an ink jet device can be used for applying the ink. Examples of the ink jet device include the following modes.

A mode of jetting ink by causing film boiling in the ink by an electro-thermal converter and forming bubbles.

A mode of jetting ink by an electro-mechanical converter.

A mode of jetting ink by using static electricity.

Among these, in view of printing with high speed and high density, the mode using an electro-thermal converter is preferably used.

Moreover, a mode of the whole ink jet device is not particularly limited. For example, the following ink jet recording head can be used.

A so-called shuttle-type ink jet recording head that performs recording while the head perpendicular to the moving direction of the transfer body is scanned.

A so-called line head-type ink jet recording head in which the ink ejection ports are arranged in a line shape substantially perpendicular to a moving direction of the transfer body (that is, substantially parallel to the axial direction when the transfer body is a drum shape).

(Ink)

Hereinafter, each component which can be used in ink is described.

(1) Coloring Material

As a coloring material contained in the ink applied to the present embodiment, a pigment or a dye can be used. The content of the coloring material in the ink is preferably 0.5% by mass or more to 15.0% by mass or less, more preferably 1.0% by mass or more to 10.0% by mass or less with respect to a total mass of the ink.

The kind of dye which can be used as a coloring material is not particularly limited, but it is preferable to use a dye having an anionic group. Specific examples of the dye include azo-based, triphenylmethane-based, (aza)phthalocyanine-based, xanthene-based and anthrapyridone-based dyes. These dyes can be used singly or two or more kinds thereof may be used in combination, if necessary.

The kind of pigment that can be used as the coloring material is not particularly limited. Specific examples of the pigment include an inorganic pigment such as carbon black and titanium oxide; and organic pigments such as azo-based, phthalocyanine-based, quinacridone-based, isoindolinone-based, imidazolone-based, diketopyrrolopyrrole-based and dioxazine-based pigments. These pigments can be used singly or two or more kinds thereof may be used in combination, if necessary. The pigment dispersion method is not particularly limited. For example, a resin-dispersed pigment dispersed with a resin dispersing agent and a self-dispersed pigment in which a hydrophilic group such as an anionic group is bonded to the pigment particle surface directly or through another atomic group can also be used. Of course, pigments having different dispersion methods may be used in combination.

In view of the image durability and the image quality, it is preferable to use a pigment as the coloring material.

(2) Pigment Dispersing Agent

As the resin dispersing agent for dispersing the pigment, a known resin dispersing agent used in an ink jet aqueous ink can be used. Among these, in the embodiment of the present embodiment, it is preferable to use an acrylic water soluble resin dispersing agent having both a hydrophilic unit and a hydrophobic unit in the molecular chain. Examples of the form of the resin include a block copolymer, a random copolymer, a graft copolymer and a combination thereof.

The resin dispersing agent in the ink may be in a state of being dissolved in a liquid medium or in a state of being dispersed as resin particles in the liquid medium. In the present invention, the fact that the resin is water-soluble means that, when the resin is neutralized with an alkali equivalent to the acid value, particles of which a particle diameter can be measured by a dynamic light scattering method are not formed.

The hydrophilic unit (unit having a hydrophilic group such as an anionic group) can be formed, for example, by polymerizing a monomer having a hydrophilic group. Specific examples of the monomer having a hydrophilic group include an acidic monomer having an anionic group such as (meth)acrylic acid and maleic acid and an anionic monomer such as an anhydride and a salt of these acidic monomers. Examples of the cation constituting the salt of the acidic monomer include ions such as lithium, sodium, potassium, ammonium and organic ammonium.

The hydrophobic unit (unit having no hydrophilicity such as an anionic group) can be formed, for example, by polymerizing a monomer having a hydrophobic group. Specific examples of the monomer having a hydrophobic group include a monomer having an aromatic ring such as styrene, α-methylstyrene and benzyl (meth)acrylate; and a monomer having an aliphatic group (that is, a (meth)acrylic ester monomer) such as ethyl (meth)acrylate, methyl (meth)acrylate and butyl (meth)acrylate.

The acid value of the resin dispersing agent is preferably 50 mgKOH/g or more to 550 mgKOH/g or less and more preferably 100 mgKOH/g or more to 250 mgKOH/g or less. The weight average molecular weight of the resin dispersing agent is preferably 1,000 or more to 50,000 or less. The content (% by mass) of the pigment is preferably 0.3 times or more to 10.0 times or less of the content of the resin dispersing agent in terms of mass ratio (pigment/resin dispersing agent).

(4) Resin Fine Particle

The ink can contain various fine particles having no coloring material. Among these, resin fine particles are preferable because the resin fine particles may be effective in improving image quality and fixing properties. The material of the resin fine particles is not particularly limited, and a known resin can be appropriately used. Specifically, examples thereof include homopolymers such as polyolefin, polystyrene, polyurethane, polyester, polyether, polyurea, polyamide, polyvinyl alcohol, poly(meth)acrylic acid and a salt thereof, poly(meth)acrylate alkyl and polydiene or a copolymer obtained by combining a plurality of these. The mass average molecular weight of the resin is preferably in the range of 1,000 or more to 2,000,000 or less. The content of the resin fine particles in the ink is preferably 1% by mass or more to 50% by mass or less and more preferably 2% by mass or more to 40% by mass or less with respect to the total mass of the ink.

Further, the resin fine particles are preferably used as a resin fine particle dispersion dispersed in ink. The dispersion method is not particularly limited, but a so-called self-dispersing resin fine particle dispersion in which a monomer having a dissociable group is dispersed by a resin obtained by homopolymerization or copolymerization of a plurality of kinds is preferable. Here, examples of the dissociable group include a carboxyl group, a sulfonic acid group and a phosphoric acid group, and examples of the monomer having this dissociable group include acrylic acid and methacrylic acid. A so-called emulsification-dispersed resin fine particle dispersion in which resin fine particles are dispersed with an emulsifier can also be preferably used. As the emulsifier here, a known surfactant is preferably used regardless of a low molecular weight or a high molecular weight. It is preferable that the surfactant is nonionic or has the same charge as the resin fine particles. The resin fine particle dispersion desirably has a dispersed particle diameter of 10 nm or more to 1,000 nm or less and more desirably a dispersed particle diameter of 100 nm or more to 500 nm or less.

When the resin fine particle dispersion is prepared, it is also preferable to add various additives for stabilization. As this additive, for example, n-hexadecane, dodecyl methacrylate, stearyl methacrylate, chlorobenzene, dodecyl mercaptan, olive oil, blue dye (blueing agent: Blue 70) and polymethyl methacrylate are preferable.

(5) Surfactant

The ink may include a surfactant. Specific examples of the surfactant include ACETYLENOL EH (trade name, manufactured by Kawaken Fine Chemicals Co., Ltd.). The content of the surfactant in the ink is preferably 0.01% by mass or more to 5.0% by mass or less with respect to the total mass of the ink.

(6) Water and Water-Soluble Organic Solvent

As a liquid medium for ink preparation, water or a mixture of water and a water-soluble organic solvent can be used. The water is preferably water deionized by ion exchange or the like. The content of the water in the ink is preferably 30% by mass or more to 97% by mass or less with respect to the total mass of the ink. Moreover, the kind of water-soluble organic solvent used in the ink is not particularly limited, and any known organic solvent can be used. Specific examples include glycerin, diethylene glycol, polyethylene glycol and 2-pyrrolidone. The content of the water-soluble organic solvent in the ink is preferably 3% by mass or more to 70% by mass or less with respect to the total mass of the ink.

(7) Other Additives

In addition to the above components, the ink may contain various additives such as a pH adjuster, a rust inhibitor, a preservative, an antibacterial agent, an antioxidant, a reduction inhibitor, a water soluble resin and a neutralizer thereof and a viscosity adjuster, if necessary.

(Removal of Liquid Components)

It is also preferable to provide a step of reducing the liquid component from the intermediate image formed on the transfer body. If the liquid component of the intermediate image is excessive, excessive liquid may overflow or spill over in the transfer step, which may cause image disturbance or transfer failure. Any of various methods used in the related art can be preferably applied as a method of removing the liquid component from the intermediate image. For example, any one of a method using heating, a method of blowing low-humidity air, a method of reducing pressure, a method of bringing the liquid component into contact with an absorber, and a method obtained by combining these is preferably used. The removal may be performed by natural drying.

(Transfer of Intermediate Image)

After the intermediate image is formed, the final image can be obtained by pressing the transfer body against the recording medium and transferring the intermediate image to the recording medium. In the present specification, the "recording medium" includes not only paper used in general printing but also a medium other than paper such as cloth, plastic and a film.

A method of pressing the intermediate image formed on the image forming surface of the transfer body against the recording medium is not particularly limited. For example, it is preferable to press the intermediate image from both of the image forming surface of the transfer body and the recording medium by using a pressing roller because the image is efficiently transferred and formed. It is also preferable to apply pressure in multiple stages because the application may be effective in reducing transfer defects.

(Heat Transfer)

In the heat transfer method, the intermediate image on the transfer body is transferred onto a recording medium in a state of being heated to a temperature set for transfer in the transfer step. Thereafter, the transfer body is cooled to a temperature preferable for intermediate image formation in the image forming step. When a series of image forming processes is repeatedly performed, these heating steps and cooling steps are repeated. The temperature in a case of transfer (transfer temperature) may be a temperature that improves the transferability by improving the adhesion properties of the intermediate image to the recording medium relative to the image forming surface of the transfer body. For example, the transfer temperature can be set according to the physical properties of the image forming surface according to the composition of the intermediate image and the physical properties of the transfer body. If the intermediate image includes resin fine particles supplied by the resin emulsion included in the ink and/or the reaction solution, in order to improve the transfer efficiency of the intermediate image, it is preferable to increase the temperature to the minimum film-forming temperature (MFT) of the resin fine particles or more.

If the porous layer having a multiple layer configuration in the transfer body satisfies at least the condition of Expression (1), a technical problem caused by repeated rise and fall in temperature in a series of image forming processes can be solved.

(Cleaning)

In an example of the above image recording method, a series of image forming processes is completed by applying a reaction solution, forming an intermediate image by application of ink, removing a liquid component from the intermediate image, and transferring the intermediate image by a heat transfer method. However, in view of productivity, the transfer body may be used repeatedly and continuously, and in that case, it is preferable to clean the surface thereof before the next image formation is performed. As a method for cleaning the transfer body, any of various methods used in the related art can be preferably applied. For example, any of the following methods can be suitably used for cleaning the transfer body.

- A method of applying a cleaning liquid to the surface of the transfer body in a shower-like manner.
- A method of abutting a wet Molton roller to the surface of the transfer body for wipe.
- A method of bringing the surface of the transfer body into contact with the cleaning liquid surface.
- A method of scraping the surface of the transfer body with a wiper blade.
- A method of applying various kinds of energy to the surface of the transfer body.

Further, a method of combining a plurality of these methods is also preferable.

(Fixing)

After the transfer as an additional step, the recording medium on which the image is recorded may be pressurized with a roller to improve the fixing properties between the recording medium and the image. In addition, fixing properties may be improved by heating the recording medium, and heating of the recording medium is also preferable. Of course, these may be simultaneously performed by using a heating roller.

<Ink Jet Recording Device>

The ink jet recording device according to the present invention includes a transfer body and an image forming unit. The image forming unit includes a reaction solution applying device that applies a reaction solution to the image forming surface of the transfer body and an ink applying device that applies ink to the image forming surface of the transfer body to form an intermediate image.

Furthermore, the ink jet recording device according to the present invention may have a heating device that heats the intermediate image to a transfer temperature to the recording medium.

Figure 2:
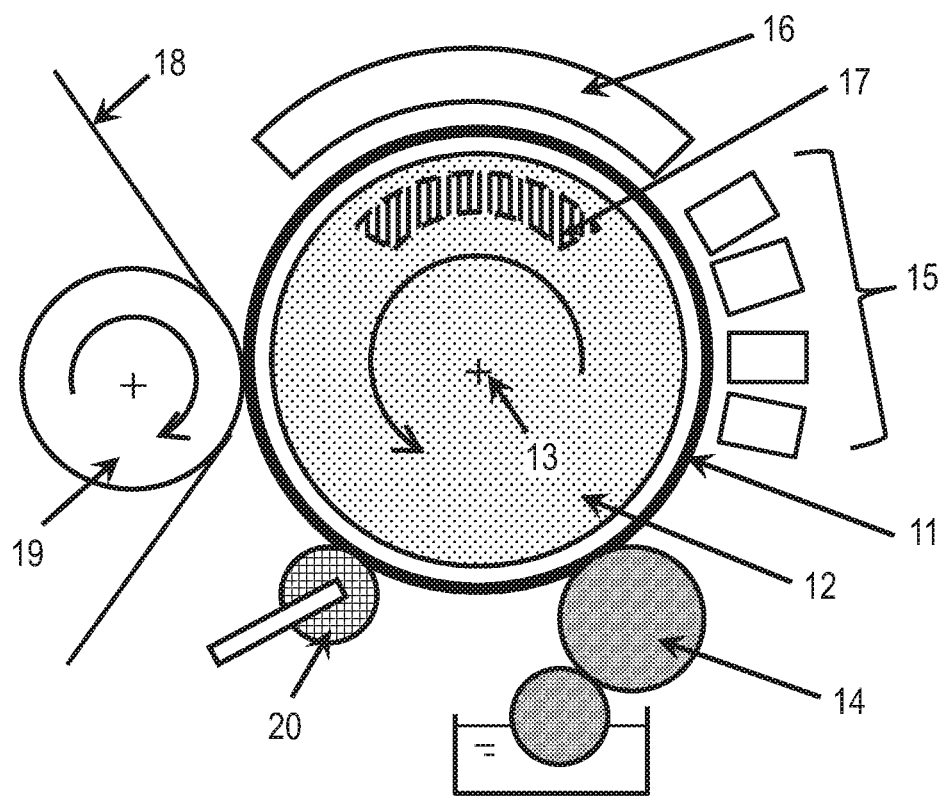
FIG. 2 is a schematic diagram illustrating a configuration of an image recording apparatus including a transfer body according to the present invention.

FIG. 2 is a schematic diagram illustrating a schematic configuration of an embodiment of the ink jet recording device according to the present invention. The transfer type ink jet recording device illustrated in the figure has a transfer body 11 supported by a support member 12, a reaction solution applying device 14, an ink applying device 15 by an ink jet method, a blowing device 16, a heating device 17, a pressing roller 19 and a cleaning unit 20.

As the transfer body 11, a transfer body having the configuration illustrated in FIG. 2 is used.

The transfer body 11 is disposed on the outer circumferential surface of a rotatable drum-shaped support member 12. The transfer body 11 is driven to rotate about a rotation shaft 13 in the direction of the arrow, and each device disposed in the circumference operates in synchronization with the rotation to form an intermediate image and form a final image on the recording medium 18 by transfer. When the drum-shaped transfer body 11 as in the present embodiment is used, it becomes easy to use the same transfer body 11 continuously and repeatedly, and the configuration that is extremely preferable in view of productivity is obtained. The image forming unit in the present embodiment includes the reaction solution applying device 14 and the ink applying device 15. As the reaction solution applying device 14, the reaction solution applying device 14 having a roll coater is provided. As the ink applying device 15, the ink applying device 15 including an ink jet recording head is provided. These devices are arranged in this order from the upstream side to the downstream side in the rotation direction of the transfer body 11, and the reaction solution is applied to the image forming surface of the transfer body 11 before ink application. The ink applying device 15 may have a plurality of ink jet recording heads. For example, when each color image by using yellow ink, magenta ink, cyan ink and black ink is formed, the ink applying device 15 has four ink jet recording heads that respectively jet the four kinds of ink onto the transfer body.

The blowing device 16 is provided as a liquid component removal treatment device that removes at least a part of the liquid component from the intermediate image by blowing air to the intermediate image.

The heating device 17 includes a heater provided inside the support member 12, and the intermediate image from the image forming surface side of the transfer body 11 can be heated by the heating device 17. The heating device 17 may be mounted on any portion in the support member other than the region illustrated in FIG. 2. The heating device may be mounted on the whole circumference in a support member. Otherwise, although not illustrated, the heating device 17 that heats the transfer body from the outside of the support member 12 may be provided. Examples of the heating device 17 that heats the transfer body from the outside of the support member 12 include an infrared heater. A nip portion is formed by the outer circumferential surface of the pressing roller 19 and the outer circumferential surface of the drum-shaped support member 12. If the recording medium 18 is caused to pass through the nip portion, the intermediate image on the transfer body supported by the support member can be pressed and transferred to the recording medium 18 by the pressing roller 19. The temperature at the time of transfer is applied by the heating device 17.

When the transfer body 11 is repeatedly and continuously used, the cleaning unit 20 is used in order to clean the surface of the transfer body 11 for the next intermediate image formation. In the present embodiment, the cleaning unit 20 that causes a wet Molton roller to abut the image forming surface of the transfer body and wipes the surface of the transfer body 11 to clean the image forming surface is provided.

EXAMPLES

Hereinafter, the present invention is more specifically described with reference to examples and comparative examples of a transfer body and an image recording method. In addition, the present invention is not limited by the following examples without departing from the gist thereof. In the following description, "parts" and "%" are based on mass unless otherwise specified.

Example 1

A porous layer P(2) having a compression modulus of elasticity and a thickness presented in Table 1 made of acrylonitrile-butadiene rubber was laminated on a 5 μm-thick base fabric layer woven with cotton yarn as a substrate. Further, silicone rubber mixed with hollow fine particles having an average particle diameter of about 60 μm was laminated on the porous layer P(2) and then was vulcanized to form a porous layer P(1) having a compression modulus of elasticity and a thickness as presented in Table 1. In the present example, two porous layers having different physical properties were laminated. The compression modulus of elasticity of the porous layer was adjusted according to the formulation ratio of hollow fine particles and additives. Next, silicone rubber mixed with 7 parts of a black masterbatch for silicone rubber was laminated on the porous layer P(1) and then was vulcanized to obtain an elastic layer having a thickness of 200 μm.

Next, a solution including a condensate obtained by mixing glycidoxypropyltriethoxysilane and methyltriethoxysilane at a molar ratio of 1:1, heating, refluxing in an aqueous solvent for at least 24 hours, and condensing an organosilicon compound was obtained. This solution was diluted with methyl isobutyl ketone so that the concentration of the condensate was 12% by mass, 5% by mass of a photocationic polymerization initiator SP150 (manufactured by ADEKA Corporation) with respect to the solid content was added, and the concentration was adjusted to the coating concentration with methyl isobutyl ketone, to obtain a coating solution. The coating liquid was applied onto the elastic layer that was subjected to plasma treatment on the surface thereof to form a film. Next, after exposure to UV light by irradiation with a UV lamp, heating at 150° C. for two hours was performed for curing, and thus a surface layer having a thickness of 295 μm was formed, to obtain a transfer body.

Examples 2 to 18 and Comparative Examples 1 to 2

Each transfer body was manufacture in the same manner as in Example 1 by using materials and layer configuration presented Table 1. The composition of the surface layer was adjusted by changing a mixing ratio of glycidoxypropyltriethoxysilane and methyltriethoxysilane or appropriately adding a heat conductive filler such as alumina. Similarly, the physical properties of the silicone rubber layer and the porous layer were adjusted in the same manner according to the formulation ratio and additives. Further, the thickness of the substrate was adjusted so as to be a total thickness of the transfer body illustrated in Table 1. In Table 1, "EPDM" is ethylene-propylene-diene rubber.

TABLE 1

| | Porous layer 1 | | | Porous layer 2 | | Porous layer 3 | | Porous layer 4 | | | | |
|---|---|---|---|---|---|---|---|---|---|---|---|---|
| | Constituent material | Thickness t1 (mm) | Compression modulus of elasticity E1 (MPa) | Thickness t2 (mm) | Compression modulus of elasticity E2 (MPa) | Thickness t3 (mm) | Compression modulus of elasticity E3 (MPa) | Thickness t4 (mm) | Compression modulus of elasticity E4 (MPa) | Total thickness of porous layers (mm) | Total thickness of transfer body (mm) | Constituent material of surface layer |
| Example 1 | Silicone | 1.2 | 5 | 0.3 | 8 | — | — | — | — | 1.5 | 2 | Organosilicon compound |
| Example 2 | Silicone | 0.5 | 5 | 0.3 | 8 | — | — | — | — | 0.8 | 2 | Organosilicon compound |
| Example 3 | Silicone | 0.7 | 5 | 0.3 | 8 | — | — | — | — | 1 | 2 | Organosilicon compound |
| Example 4 | Silicone | 0.5 | 5 | 0.5 | 8 | — | — | — | — | 1 | 2.5 | Organosilicon compound |
| Example 5 | Silicone | 0.5 | 5 | 0.4 | 8 | 0.35 | 8 | — | — | 125 | 2.5 | Organosilicon compound |
| Example 6 | Silicone | 0.5 | 5 | 0.3 | 8 | 0.4 | 8 | — | — | 1.2 | 3 | Organosilicon compound |
| Example 7 | Silicone | 0.5 | 5 | 0.5 | 8 | 0.5 | 8 | 0.5 | 8 | 2 | 3 | Organosilicon compound |

TABLE 1-continued

|  | Porous layer 1 | | | Porous layer 2 | | Porous layer 3 | | Porous layer 4 | | | | |
| --- | --- | --- | --- | --- | --- | --- | --- | --- | --- | --- | --- | --- |
|  | Constituent material | Thickness t1 (mm) | Compression modulus of elasticity E1 (MPa) | Thickness t2 (mm) | Compression modulus of elasticity E2 (MPa) | Thickness t3 (mm) | Compression modulus of elasticity E3 (MPa) | Thickness t4 (mm) | Compression modulus of elasticity E4 (MPa) | Total thickness of porous layers (mm) | Total thickness of transfer body (mm) | Constituent material of surface layer |
| Example 8 | Silicone | 0.5 | 2 | 0.5 | 5 | — | — | — | — | 1 | 2 | Organosilicon compound |
| Example 9 | Silicone | 0.5 | 2 | 0.3 | 5 | 0.3 | 5 | — | — | 1.1 | 2.5 | Organosilicon compound |
| Example 10 | Silicone | 0.5 | 0.5 | 0.25 | 5 | — | — | — | — | 0.75 | 1.5 | Organosilicon compound |
| Example 11 | Silicone | 0.3 | 0.5 | 0.1 | 5 | — | — | — | — | 0.4 | 1 | Organosilicon compound |
| Example 12 | Silicone | 1.2 | 0.1 | 0.3 | 30 | — | — | — | — | 1.5 | 2 | Organosilicon compound |
| Example 13 | Silicone | 0.3 | 0.1 | 1.2 | 5 | — | — | — | — | 1.5 | 2.5 | Organosilicon compound |
| Example 14 | Silicone | 0.6 | 5 | 0.35 | 10 | 0.35 | 10 | — | — | 1.5 | 2 | Organosilicon compound |
| Example 15 | Fluororubber | 0.6 | 5 | 0.35 | 10 | 0.35 | 10 | — | — | 1.5 | 2 | Organosilicon compound |
| Example 16 | EPDM | 0.6 | 5 | 0.35 | 10 | 0.35 | 10 | — | — | 1.5 | 2 | Organosilicon compound |
| Example 17 | Silicone | 0.6 | 2 | 0.3 | 5 | 0.3 | 5 | — | — | 1.2 | 2.5 | (Meth)acrylic copolymer |
| Example 18 | Silicone | 1.5 | 2 | 0.3 | 5 | — | — | — | — | 1.8 | 2 | Organosilicon compound |
| Comparative Example 1 | EPDM | 0.5 | 10 | — | — | — | — | — | — | 0.5 | 0.8 | Organosilicon compound |
| Comparative Example 2 | Silicone | 0.3 | 5 | 0.3 | 10 | — | — | — | — | 0.6 | 2 | Organosilicon compound |

The physical properties of each layer constituting each transfer body were obtained by the following method.

(1) Thickness

The thickness of each layer constituting the transfer body can be measured by cutting the transfer body in any size and observing a cross section thereof. The thickness is a value obtained by measuring thicknesses at any 10 points selected so as not to be biased with an electron microscope and averaging the thicknesses.

(2) Compression Modulus of Elasticity

The compression modulus of elasticity of each layer constituting the transfer body is a value obtained by cutting each layer from the transfer body and performing measurement in accordance with JIS K 7181 by using a viscoelastic spectrometer.

(3) Compression Amount-Stress Characteristics

The compression amount-stress characteristic of the transfer body is a value measured according to JIS B 9611 using a material testing machine. The results obtained are presented in Table 2.

TABLE 2

|  | Compression amount a (mm) | Stress | | |
| --- | --- | --- | --- | --- |
|  |  | X (MPa) | Y (MPa) | Z (MPa) |
| Example 1 | 0.1 | 0.3 | 0.7 | 1 |
| Example 2 | 0.2 | 0.5 | 1.5 | 2 |
| Example 3 | 0.2 | 0.5 | 1 | 1.5 |
| Example 4 | 0.2 | 0.5 | 1 | 1.5 |
| Example 5 | 0.1 | 0.4 | 0.8 | 1.5 |
| Example 6 | 0.15 | 0.5 | 1 | 1.5 |
| Example 7 | 0.1 | 0.1 | 0.3 | 0.5 |
| Example 8 | 0.2 | 0.5 | 1 | 1.5 |
| Example 9 | 0.2 | 0.5 | 1 | 1.5 |
| Example 10 | 0.1 | 0.5 | 1.5 | 2 |
| Example 11 | 0.1 | 0.5 | 1.5 | 2.5 |
| Example 12 | 0.1 | 0.1 | 0.3 | 0.5 |
| Example 13 | 0.2 | 0.3 | 0.7 | 1 |
| Example 14 | 0.15 | 0.5 | 1 | 1.5 |
| Example 15 | 0.15 | 0.5 | 1 | 1.5 |
| Example 16 | 0.15 | 0.5 | 1 | 1.5 |
| Example 17 | 0.2 | 0.5 | 1 | 1.5 |
| Example 18 | 0.1 | 0.05 | 0.5 | 0.7 |
| Comparative Example 1 | 0.15 | 0.5 | 2 | 5 |
| Comparative Example 2 | 0.15 | 0.3 | 2 | 5 |

(Evaluation of Transfer Body)

As described below, each transfer body was mounted on a heat transfer type image recording apparatus and the performance thereof was evaluated.

The reaction solution and ink used in the present example were prepared as follows.

(Adjustment of Reaction Solution)

The reaction solution was adjusted by mixing and stirring sufficiently the components having the following composition and then performing pressure filtration with a microfilter having a pore size of 3.0 μm.

Glutaric acid: 55 parts
8N aqueous potassium hydroxide solution: 20 parts
Glycerin: 10 parts
Surfactant (trade name, ACETYLENOL E100, manufactured by Kawaken Fine Chemicals Co., Ltd.): 1 part
Ion exchange water: 14 parts.

(Preparation of Ink)

First, each of the pigment dispersion liquid and the resin fine particle dispersion was prepared by the following procedures.

(1) Preparation of Black Pigment Dispersion Liquid 10 parts of Carbon black (trade name: MONARCH 1100, manufactured by Cabot), 15 parts of a pigment dispersing agent aqueous solution (styrene-ethyl acrylate-acrylic acid copolymer; acid value: 150, weight average molecular weight: 8,000; solid content 20%; neutralized with potassium hydroxide) and 75 parts of pure water were mixed. This mixed solution was introduced into a batch type vertical sand mill (manufactured by Imex Co., Ltd.), 200 parts of zirconia beads having a diameter of 0.3 mm were charged, and a dispersion treatment is performed for five hours with water cooling. The dispersion liquid was centrifuged with a centrifuge to remove coarse particles, and a black pigment dispersion liquid having a pigment concentration of about 10% was obtained. (2) Preparation of resin fine particle dispersion 18 parts of butyl methacrylate, 2 parts of 2,2'-azobis-(2-methylbutyronitrile), and 2 parts of n-hexadecane were mixed and stirred for 0.5 hours. This mixture was dropwise added to 78 parts of a 6% aqueous solution of a styrene-acrylic acid copolymer (acid value: 120 mgKOH/g, weight average molecular weight: 8,700) as an emulsifier, and stirred for 0.5 hour. Next, irradiation with the ultrasonic wave was performed for three hours with the ultrasonic irradiation machine. Subsequently, a polymerization reaction was performed in a nitrogen atmosphere at 80° C. for four hours, and filtration was performed after cooling at room temperature, to obtain a resin fine particle dispersion having a concentration of about 20%. The mass average molecular weight of the resin fine particles was about 200,000, and a dispersed particle diameter was about 250 nm.

A black ink having the following composition was prepared. Specifically, the reaction solution was adjusted by mixing and sufficiently stirring each of the following components and then performing pressure filtration with a microfilter (manufactured by Fujifilm Corporation) having a pore size of 3.0 μm.

The above black pigment dispersion liquid (Concentration: about 10%): 20 parts
Resin fine particle dispersion described above (concentration: about 20%): 20 parts
Glycerin: 5 parts
Diethylene glycol: 5 parts
Surfactant (trade name, ACETYLENOL EH, manufactured by Kawaken Fine Chemicals Co., Ltd.): 1 part
Ion exchange water: 45 parts.

Image formation was performed by using the image forming device of FIG. 2. As the support member 12 of the transfer body 11, a cylindrical drum made of an aluminum alloy was used. Thus, in addition to the rigidity and dimensional accuracy that can withstand the pressurization in a case of transfer, required characteristics such as improvement of control responsiveness by reduction of rotational inertia can be satisfied.

(Image Forming Method)

As illustrated in FIG. 2, the transfer body manufactured by the above method was mounted on the outer circumferential surface of the support member 12. Next, when an image is formed, first, while the transfer body 11 was rotated in the direction of the arrow in FIG. 2, the reaction solution is applied to the surface of the transfer body by the reaction solution applying device 14. Next, the ink is jetted from the ink applying device 15 to the surface of the transfer body. Accordingly, the reaction solution and ink were reacted with each other on the surface of the transfer body 11 to form an intermediate image. After the intermediate image was formed, the liquid component in the intermediate image was removed by the heating device 17 and the blowing device 16 embedded in the support member 12 of the transfer body 11. Next, according to the rotation of the transfer body, the intermediate image passed through a portion between the transfer body and the pressing roller 19. At this time, the intermediate image was pressure-bonded to the recording medium 18, and the intermediate image is transferred from the transfer body to the recording medium 18. The surface of the transfer body after the transfer of the intermediate image was cleaned by the cleaning unit 20 to be sanitized. Image recording is repeatedly performed by repeating the above operation together with the rotation of the transfer body. The maximum temperature in the image forming step of the intermediate image was set to 70° C. by a temperature control device (not illustrated). The minimum temperature in the transfer step of the intermediate image was set to 100° C. by heating with the heating device 17. These temperatures were controlled by using the temperature of the surface layer of the transfer body.

As the ink jetting pattern in a case of forming the intermediate image, a 100% solid image pattern in which a solid image having a recording duty of 100% was formed in a range of 1 cm×1 cm was used. In the above image recording apparatus, the condition that one droplet of 4 ng of ink was applied to a unit area of 1/1,200 inch×1/1,200 inch with a resolution of 1,200 dpi×1,200 dpi is defined as the recording duty of 100%.

(Transferability of Image)

The transfer body after the transfer step was observed with an optical microscope, the remaining area of the intermediate image was calculated, and (100−(remaining area of the intermediate image)/(area of the intermediate image)) was calculated, to measure a transfer rate to the recording medium.

<Evaluation Standard for Transferability>

A: A transfer rate to the recording medium was 95% or more
B: A transfer rate to the recording medium was 90% or more to less than 95%
C: A transfer rate to the recording medium was 80% or more to less than 90%
D: A transfer rate to the recording medium was less than 80%

(Evaluation of Image Quality)

With respect to the evaluation of the image quality, an intermediate image formed on the transfer body and a final image on the recording medium were observed with an optical microscope, an area of each image was calculated, and evaluation was performed by ((final image area−intermediate image area)/(final image area)) which was a rate of change according to the following standard.

<Standard of Image Quality Evaluation>

A: A change rate was less than 0.5%
B: A change rate was 0.5 or more to less than 1%
C: A change rate was 1% or more to less than 3%
D: A change rate was 3% or more (Durability)

The damage to the side closest to the surface layer of the transfer body after the image forming step was repeated 50,000 times was visually evaluated by using the following standard.

A: Damage on the side closest to the surface layer was not observed even after the step was repeated 50,000 times.
B: Damage on the side closest to the surface layer was not observed after repetition of 30,000 times, but cracks were observed on the side closest to the surface layer after repetition of 50,000.
C: Damage on the side closest to the surface layer was not observed after repetition of 10,000 times, but cracks were observed on the side closest to the surface layer after repetition of 30,000.
D: Cracks were observed on the side closest to the surface layer after repetition of 10,000.

The obtained evaluation results are presented in the following table.

TABLE 3

|  | Transferability | Image quality | Durability |
|---|---|---|---|
| Example 1 | A | A | A |
| Example 2 | A | B | B |
| Example 3 | A | A | A |
| Example 4 | A | A | A |
| Example 5 | A | A | A |
| Example 6 | A | A | A |
| Example 7 | B | A | A |
| Example 8 | A | A | A |
| Example 9 | A | A | A |
| Example 10 | A | B | B |
| Example 11 | A | B | C |
| Example 12 | B | A | A |
| Example 13 | A | B | B |
| Example 14 | A | A | B |
| Example 15 | B | A | A |
| Example 16 | B | A | A |
| Example 17 | B | B | B |
| Example 18 | C | C | A |
| Comparative Example 1 | A | C | D |
| Comparative Example 2 | A | C | D |

According to the present invention, it is possible to provide a transfer body for image recording by a heat transfer method capable of achieving both image quality and durability even in repeated use, and an image recording method and an image recording apparatus using the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A transfer body for image formation by a heat transfer method, the transfer body comprising:
    a substrate;
    a plurality of porous layers provided on the substrate; and
    a surface layer having an image forming surface,
    wherein when a thickness (mm) of each porous layer from a porous layer P(1) of the plurality of porous layers on a side closest to the surface layer to a porous layer P(n) on a side closest to the substrate is set to t(n) (n≥3), and a total thickness of the transfer body is set to T (mm), Expression (1) is satisfied:

$C \times T \leq t(1) + \ldots + t(n)$  (1), wherein C=0.4, T≥1, and n is an integer of 10 or less, and
    wherein the thickness of each porous layer is such that Expression (2) is satisfied:

$0.8 \leq t(1) + \ldots + t(n) \leq 1.5$, and  Expression (2)

wherein when a compression modulus of elasticity (MPa) of each porous layer from the porous layer P(1) on the side closest to the surface layer to the porous layer P(n) on the side closest to the substrate is set to E(n), Expression (3) is satisfied:

$E(1) < E(2 \text{ to } n)$.  Expression (3)

2. The transfer body according to claim 1, wherein the C is 0.5.

3. The transfer body according to claim 1, wherein the compression modulus of elasticity (MPa) of each porous layer of the transfer body is 0.1≤E1<E(2 to n)≤30.

4. The transfer body according to claim 1, wherein, when a stress when a compression amount is "a" (mm) is set to X (MPa), and a stress when a compression amount is a+0.2 (mm) is set to Y (MPa), the X satisfies Expression (4), and the Y satisfies Expression (5):

$0.1 \leq X \leq 0.5$  Expression (4)

$0.5 \leq Y \leq 1.5$  Expression (5), wherein 0.1 (mm)≤a≤0.2 (mm).

5. The transfer body according to claim 1, wherein, when a stress when a compression amount is "a" (mm) is set to X (MPa), and a stress when a compression amount is a+0.3 (mm) is set to Z (MPa), the X satisfies Expression (4), and the Z satisfies Expression (6):

$0.1 \leq X \leq 0.5$  Expression (4)

$0.5 \leq Z \leq 2.0$,  Expression (6)

wherein 0.1≤a≤0.2.

6. The transfer body according to claim 1, wherein each of the porous layers of the transfer body independently includes at least one of silicone rubber, fluororubber and ethylene-propylene-diene rubber.

7. The transfer body according to claim 1, wherein the surface layer contains a condensate of an organosilicon compound.

8. The transfer body according to claim 1, which is suitable for use as a transfer body in an image forming method, including: an intermediate image forming step of applying ink to the image forming surface of the transfer body to form an intermediate image; a transfer step of transferring the intermediate image to a recording medium; and a heating step of heating the intermediate image on the transfer body.

9. The transfer body according to claim 8, wherein the applying of the ink to the image forming surface is performed by an ink jet method.

10. An image recording method, comprising:
    an image forming step of applying ink to an image forming surface of a transfer body to form an intermediate image;
    a transfer step of transferring the intermediate image to a recording medium; and
    a heating step of heating the intermediate image on the transfer body,
    wherein the transfer body is the transfer body according to claim 1.

11. The image recording method according to claim 10, wherein the image forming step includes a reaction solution applying step of applying a reaction solution to the image forming surface.

12. The image recording method according to claim 10, the applying of the ink to the image forming surface is performed by an ink jet method.

13. The transfer body according to claim 1, wherein the substrate contains woven fabric.

* * * * *